March 5, 1946.                E. A. HOBART                2,396,176
                 IDLING MECHANISM FOR WELDING APPARATUS
              Original Filed Nov. 20, 1943    2 Sheets-Sheet 1
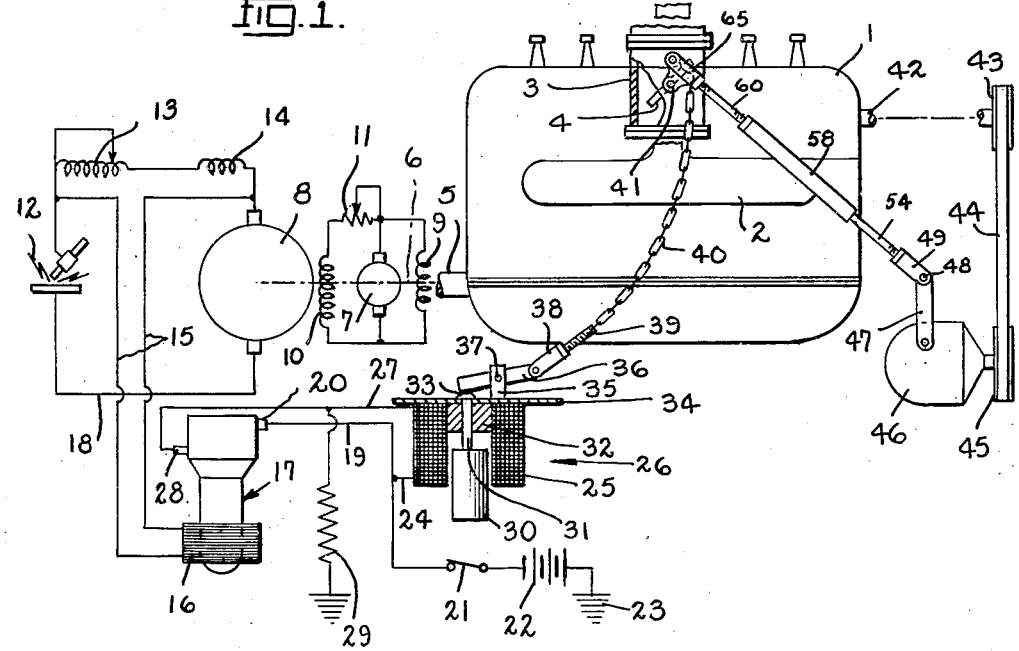
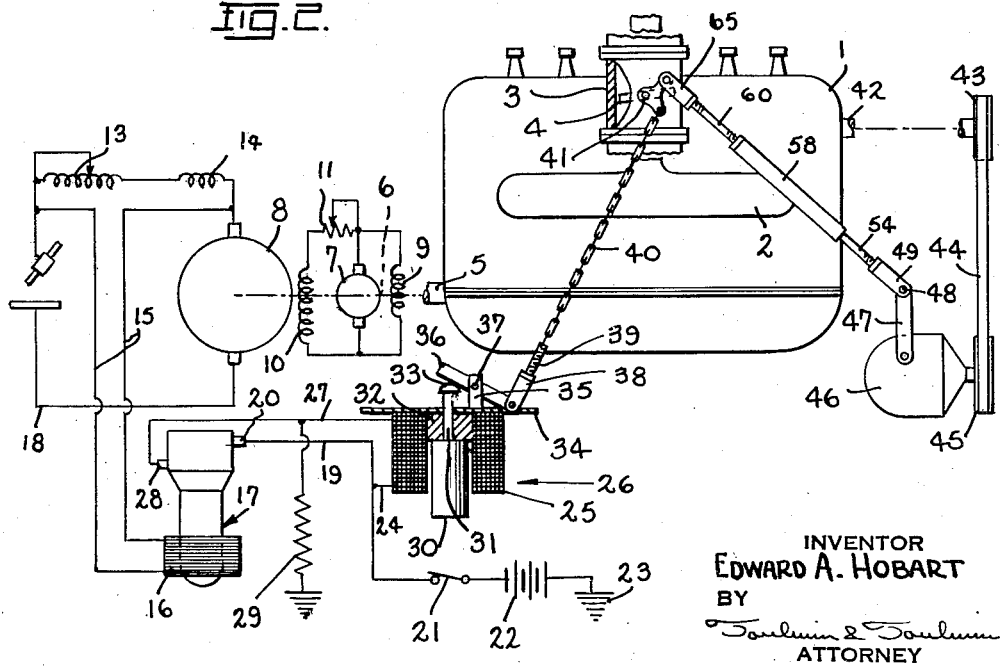
INVENTOR
EDWARD A. HOBART
BY
Toulmin & Toulmin
ATTORNEY March 5, 1946. E. A. HOBART 2,396,176
IDLING MECHANISM FOR WELDING APPARATUS
Original Filed Nov. 20, 1943 2 Sheets-Sheet 2
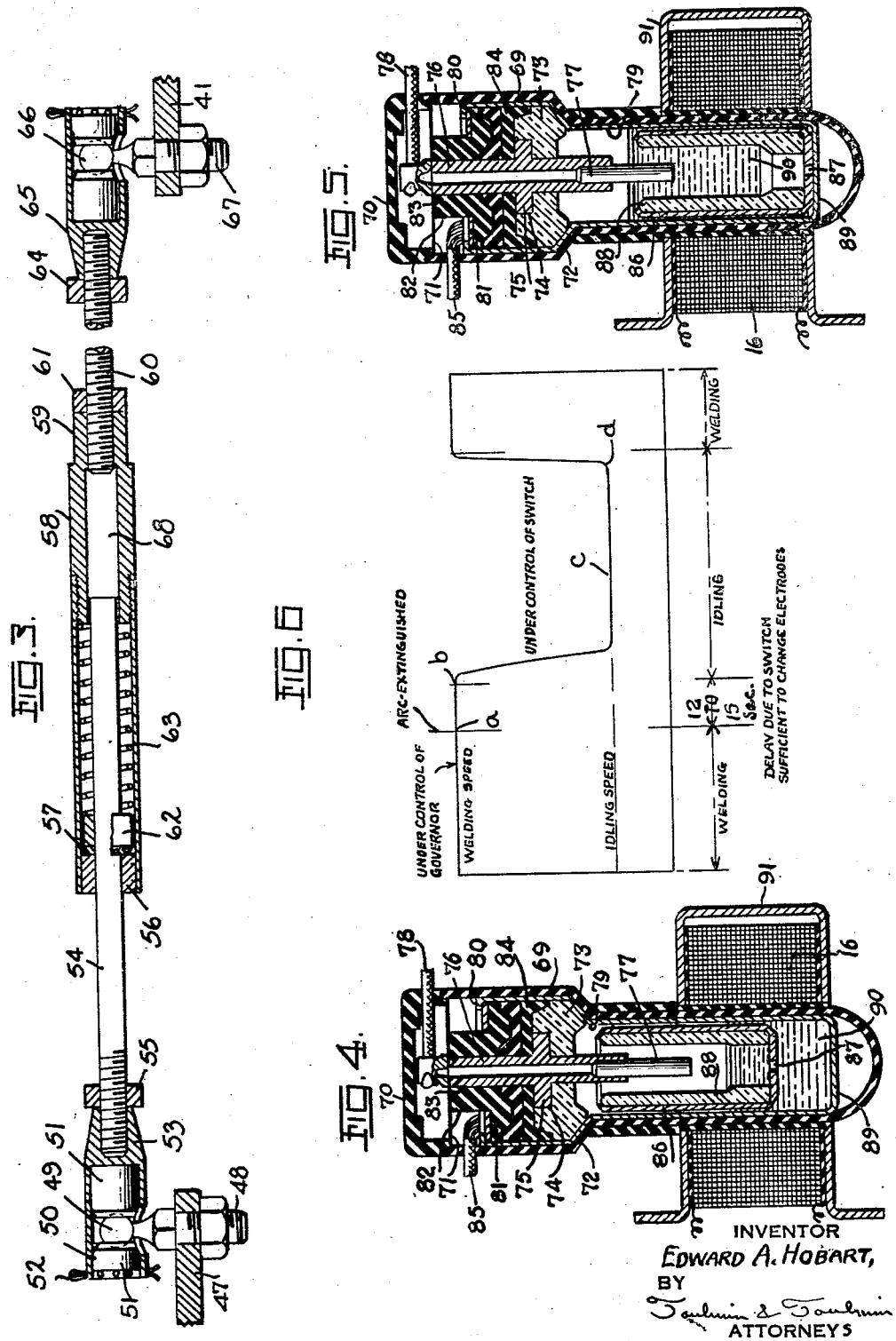
INVENTOR
EDWARD A. HOBART,
BY
ATTORNEYS Patented Mar. 5, 1946

2,396,176

UNITED STATES PATENT OFFICE 2,396,176

IDLING MECHANISM FOR WELDING APPARATUS

Edward A. Hobart, Troy, Ohio, assignor to The Hobart Bros. Company, Troy, Ohio, a corporation of Ohio Continuation of application Serial No. 511,011, November 20, 1943. This application September 7, 1944, Serial No. 552,965

6 Claims. (Cl. 290—40)

The present invention relates to welding apparatus and more particularly to devices for regulating or controlling the speed of the prime mover in accordance with the demand on the welding generator.

It is desirable to effect a reduction in speed of the gasoline engine or other primary source of mechanical power when the load on the welding generator is temporarily stopped so as to reduce wear and tear on the engine during such periods of inaction and also to cut down the fuel consumption as much as possible. A number of difficulties are encountered in utilizing a system of this character, for example, the automatic speed reducing device must selectively operate only after a predetermined length of time, usually 12 to 15 seconds after the welding arc has stopped, sufficient to give the operator opportunity of changing or renewing the welding electrode. Perhaps the greatest difficulty in this connection is to provide an idling device which may control the same throttle as the governor and yet can close the throttle without having to resist the governor action. During the welding operation, the governor must be permitted to control the engine speed in order to obtain flat speed regulation at the generator while under welding load without any disturbance from the idling device.

The primary object of the invention is to provide an idling device or apparatus of an inexpensive but highly efficient type which operates to reduce the speed of the prime mover in any predetermined amount after a definite time has elapsed from the time that the welding current has been cut off.

Another object is to provide an idling device of the type referred to which can operate either in combination with or separately from the governor speed control apparatus, the arrangement being such that during the welding operation the speed of the engine is under the exclusive control of the governor but when the welding operation is stopped, the speed of the engine is under the exclusive control of the improved idling device.

Still another object is to provide apparatus by which the speed of the prime mover is reduced automatically in any desired amount but only after a predetermined time delay from the moment that no welding current is being taken from the generator.

The above objects are carried out in brief by providing a powerful magnetic actuator which is mechanically connected to the throttle valve of the engine and coupling the same throttle to the usual speed governor through an extensible link which so cooperates with the actuator that there is no interference between the latter and the link during either the normal speed regulation by the governor or any interference with the operation of the idling device when the engine speed is being cut down during the non-welding intervals of time. In order to prevent the operation of the idling device during the short time that the operator is changing electrodes but is contemplating immediate further use of the welder, a time delay switch of an improved character is electrically connected both to the operating coil of the actuator and also to the field circuit of the generator so as to introduce the required time factor.

Other objects and features will be apparent when the following description is perused in connection with the accompanying drawings in which:

Figure 1 represents a schematic layout of the improved apparatus and inter-connected mechanical and electrical system by which the delayed idling function referred to above may be obtained. This figure indicates the positions of the various elements during the welding operation and in which the engine is under the control exclusively of the usual speed governor.

Figure 2 is a layout similar to Figure 1 but showing the delayed operation of the idling device after welding has stopped.

Figure 3 illustrates by way of a sectional view with a few parts in elevation an improved mechanical linkage between the speed governor of the engine and the throttle, also a connection between the idling device and the mechanical linkage, the arrangement being such that the throttle is under the independent control during exclusive periods of time of the speed governor and the idling device.

Figure 4 is a vertical sectional view of a timing switch for introducing a time delay of adjustable character between the time that electrical energy is removed from the actuating coil and the time that the switch actually performs its switching function. Figure 4 shows a switch in "open" position, while Figure 5 shows a switch in closed or short-circuiting position.

Figure 6 is a graphical diagram indicating the welding and idling periods of the welding apparatus and showing the manner in which the speed of the engine or other prime mover is considerably reduced during the idling period.

Referring more particularly to Figures 1 and 2, numeral 1 designates a prime mover such as a gas engine provided with an intake manifold 2 on which is mounted a carburetor 3 including a butterfly valve 4. The main shaft 5 of the engine is mechanically coupled, as indicated by the dot-dash line 6 to an exciter generator 7 and also to the armature of a main welding generator 8. The shunt field 9 of the generator and the field 10 of the welding generator 8 are connected through a variable resistor 11 to the armature of the exciter generator 7. Consequently, when the gas engine 1 operates, the exciter generator 7 provides a field current for the welding generator 8 and the current from the main generator may be employed for welding purposes as indicated at 12.

In addition to being provided with the field 10, the welding generator or armature 8 is wound with a series field 13 of adjustable character and is also provided with inter-poles or a commutating field 14. Connections 15 are taken from one side of each of the series and commutating field to a solenoid 16 which forms part of an improved time delay switch generally indicated at 17. One of the conductors 15 is also connected to the upper or movable welding electrode while the other conductor 15 is connected to one side of the armature 8. The other side of the generator armature is connected through a conductor 18 to the grounded workpiece on which the welding operation is being performed.

A conductor 19 is taken from a terminal 20 on the upper end of the switch 17 and the conductor also includes a hand operated switch 21 and a battery 22 which connects to ground 23. A wire 24 is connected between the conductor 19 and a solenoid 25 of an electromagnetic actuator generally indicated at 26. The other side of the solenoid is connected through a wire 27 to a terminal 28 positioned at the upper end of the switch 17, but insulated from the terminal 20 as will be described hereinafter. A fixed resistor 29 is connected between the wire 27 and ground.

Within the solenoid 25 there is a reciprocable plunger 30 which supports a plunger rod 31 passing loosely through a guide plate 32. The latter is contained within the solenoid and its purpose is to guide the sliding movements of the rod when the electromagnet 25 is alternately energized and de-energized. The rod 31 terminates in a knob 33 which may rest on a plate 34 for limiting the downward movement of the rod. There is an upstanding support 35 secured to the plate 34 and a lever 36 is pivotally mounted as indicated at 37 on the support. An arm 38 is swivelly secured to the lever 36, the arm being provided with a threaded adjustment rod 39 to which a chain 40 is attached. The upper end of the chain is secured to the arm of a bell crank lever 41 pivotally mounted on the carburetor 3. The arrangement is such that when the plunger 30 is caused to move upwardly within the solenoid 25 the lever 36 is rotated clockwise and the chain 40 is rendered taut to rotate the bell crank lever 41 clockwise (Figure 2). The conditions under which the plunger 30 is drawn into the solenoid 25 will be explained in connection with the operation of the time delay switch 17.

An auxiliary shaft 42 is also taken from the engine 1, the shaft terminating in a pulley 43 which receives a belt 44. The latter drives a pulley 45 connected to any suitable form of speed governor 46 the actuated element of which is typified by a swingable lever 47. The latter is connected to the bell crank lever by an improved form of slip rod joint illustrated in detail in Figure 3.

The governor lever 47 is connected through a threaded rod 48 to a swivel bearing 49 of any well known and suitable type contained within a metal bearing 50. The swivel bearing may comprise a spherical member positioned between arcuate recesses formed at the ends of a pair of oppositely disposed plugs 51 contained within the tubular member 50 and held in position by a cotter pin 52. The member 50 terminates in a solid portion indicated at 53 which has a threaded wall to receive a threaded rod 54 which passes through an adjusting nut 55. The rod 54 is slidably received by a plug 56 which is secured to the left hand end of a metal cylinder 57. The latter is threaded over the end of a heavy metal tube 58 and this tube is provided with a reduced diameter portion 59 having a threaded bore for receiving a rod 60. An adjusting nut 61 surrounds the rod 59 and abuts the right hand end of the tube 59.

A heavy washer or plug 62 is secured to the rod 54 and is contained within the cylinder 57 immediately to the right of the plug 56. There is a compression spring 63 positioned between the heavy washer 62 and the left hand interior end of the tubing 58.

The rod 60 is threaded through an adjusting nut 64 into the solid end of a hollow metal member 65 which receives a swivel bearing 66 similar to the structure provided at the opposite end of the slip rod joint. The upper end of the bell crank lever 41 (Figure 1) is connected through a stud 67 to the swivel bearing 66.

The operation of the speed control apparatus will be apparent from the foregoing description. As the engine tends to speed up due to a slightly less welding load on the generator the governor 46 rotates proportionately faster to cause the actuating lever 47 to rotate slightly clockwise. Thus, a pull is exerted on the rod 54 to the left as seen in Figure 3 which causes the plug 62 to push against plug 56 and exerts a pull to the left on the swivel bearing 66. This in turn causes rotation of the bell crank lever 41 tending to close the throttle 4. Thus, the speed of the engine is maintained relatively constant regardless of slight variations in the welding current drawn from the generator 8 and a flat speed characteristic is imparted to the generator. It is apparent that as the generator current is increased during the welding operation the load on the engine 1 becomes greater, tending to reduce its speed below normal and the governor 46 would operate to rotate the throttle valve 4 counterclockwise (Figure 1) and thereby increase the supply of fuel to the engine.

Now, supposing for any reason that no load current had been drawn from the welding generator 8 for an appreciable length of time so that it was desired to reduce the speed of the engine to an idling speed in order to save wear and tear on the various reciprocating parts of the engine and also to reduce the amount of fuel drawn. The electromagnet 25 is caused to be energized in a manner as will be explained hereinafter so that the plunger 30 is drawn strongly upward as indicated in Figure 2. The lever 36 is caused to rotate clockwise about its axis 37 so that the chain 40 is rendered taut and the bell crank lever 41 is caused to rotate clockwise to close the throttle valve 4.

It will be noted that this rotation of the lever 41 will have no effect on the governor lever 47 because the slip rod joint is so designed as to permit a reduction of its length and all of the thrust exerted downwardly on the joint by the movement of the lever 41 is accommodated by the spring. This can be readily observed in Figure 3 because any movement to the left of the swivel member 66 merely causes the sleeve 57 and its plug 56 to slide to the left over the rod 54, thus compressing spring 63 against the plug 62 which remains fixed in space. The opening 68 within the tubular member 58 readily receives the right hand end of the rod 54. The amount of shortening of the slip rod joint that can be accommodated in this manner may be varied by predetermining the length of that portion of the screw 60 which threads into the tubular portion 59. Inasmuch as there is no change in position of the speed governor lever 47 when the chain 40 rotates the throttle valve 4 to a relatively closed position the governor is ready to take over the speed control of the engine when the chain 40 is loosened upon de-energization of the electromagnet 25 as indicated in Figure 1.

The electromagnet 25 is normally de-energized during the welding operation and becomes energized only when the welding has ceased for an indefinite period of time but after a predetermined time delay. It is apparent that it would not be practical to reduce the speed of the engine to an idling speed during short intervals of time as when the operator has merely stopped welding solely for the purpose of changing or renewing the welding electrode and it was his intention to immediately resume the welding operation. However, there are numerous periods of time, as for example, when the location of the weld is being changed or when work is being placed in position for welding that the welding generator will run absolutely at no load and the engine will be performing no useful work. Under these circumstances, it is highly desirable to cut down the speed of the engine to the lowest speed consistent with permitting the engine to turn over, thereby reducing wear and tear on the engine, also the rate and amount of fuel used up.

In accordance with another feature of the invention, there is employed an improved form of time delay switch which cooperates with the electromagnetic actuator 26 in such a manner as to introduce the time delay factor referred to above. This switch is shown in Figures 4 and 5 which will now be described. Reference character 69 represents a casing, preferably of cylindrical configuration and made of any suitable insulating material. There is an insulator cap 70 shouldered at 71 and fitted on top of the casing. The latter is provided with a counterbore 74 for receiving the flange portion 75 of a long metal tube 76. This metal tube is provided at its lower end with a metal tip or electrode 77 positioned concentrically with respect to the casing. A conductor 78 is connected to the upper end of the metal tube 76. There is a long metal cylinder 79 with non-magnetic properties which fits snugly within the interior of the casing 69 and effectively secured thereto by reason of a conically shaped shoulder which sets on the corresponding shoulder 72 of the casing. The ceramic washer 73 holds the shoulder portion of the cylinder 79 against the casing. The upper end of the cylinder 79 is flanged at 80 for holding in place a metal washer 81. The latter fits about the hub portion 82 of a heavy compression insulator 83 which rests on two or more sealing gaskets or washers 84 of insulating material, which are in turn supported on the ceramic washer 73. A conductor 85 is taken from the metal washer 81 to the exterior of the switch. The conductors 78 and 85 are preferably sealed to the casing 69 so that the entire interior of the casing is completely sealed.

A metal cylinder 86, open at the top, but closed at the bottom except for a relatively small opening 87 is loosely received by the interior of the metal cylinder 79 so as to permit the cylinder 86 freely to move with respect to the adjacent cylinder. There is a ceramic tubing 88 fitted snugly within the interior of the metal cylinder 86 and both cylinders 86 and 79 are concentrically arranged about the metal tip 77. The metal cylinder 79 is closed at the bottom as indicated at 89 and contains mercury 90 which extends through the opening 87 into the interior of the ceramic tube 88. The solenoid 16 surrounds the lower end of the casing 69 and is spaced from the shoulder 72 by a tube 91 of insulating material. If desired, the solenoid may be contained within a metal shell 91 of magnetic material which may constitute a core of the shell type.

Thus, when the coil 16 is energized, the cylindrical plunger 86 is drawn downwardly and displaces mercury which tends to flow upwardly around the sides and overflow into the interior of the metal cylinder 86. Under normal conditions, i. e. when the coil 16 is de-energized the plunger 86 merely floats on or in the mercury, leaving only a relatively small amount of mercury within the plunger. The rate at which the plunger 86 is pulled downwardly is practically instantaneous as the restriction to flow of mercury upward around the plunger is very small. Under these circumstances, the level of the interior body of the mercury rapidly rises until it makes contact with the electrode tip 77, this condition being shown in Figure 5.

A closed circuit is therefore established between the conductor 78 through the metal tube 76, the metal tip 77, the mercury 90 and the metal cylinder 79 to the opposite conductor 85. It is apparent that the conductors 78 and 85 are insulated from one another except through the circuit that has been traced. In order to prevent arcing effects between the upper surface of the mercury 90 and the electrode tip 77, the interior of the casing 69 may be filled with any suitable inert gas.

Now when the coil 16 is de-energized, the plunger 88 tends to rise in the mercury. The only way the mercury can escape is through the opening 87. In time enough mercury will escape through the opening 87 that the contact between the mercury and the metal tip 77 is broken. Any practical amount of time delay in opening the circuit between conductors 78 and 85 can be effected at the switch 17 by a proper determination of the size of the opening 87 as this opening regulates the speed with which mercury can move between the upper and lower portions of the switch. As much as 15 seconds or more delay may be obtained if desired.

Referring now to the electrical circuits immediately associated with the welding generator 8, the time delay switch 17 and the electromagnetic actuator 25, and assuming that the hand switch 21 has been closed, it will be noted that when no circuit has been established through the switch 17 current flows from the battery 22 through the coil 25 and the resistor 29 to ground. This is a condition as shown in Figure 2 in which the plunger 30 is drawn upwardly to render the chain 40 taut and thus to cause the engine to idle at relatively low speed as was explained hereinbefore. However, when the welding operation is proceeding as indicated in Figure 1, current passing through the armature 8 of the welding generator and the series connected coils 13 and 14 will cause the energization of the solenoid 16. The metal cylinder plunger 86 is thereby caused to be drawn downwardly as explained hereinbefore and the mercury 90 is caused to overflow within the cylinder 86 and to make contact with the electrode tip 77. A circuit is therefore established directly between the conductors 77 and 85 of the switch.

Referring again to Figure 1, it will be noted that the contacts of the mercury switch 17 put a short-circuit path about the solenoid 25 causing current to be diverted around it and through the current-limiting resistance 29 to ground. With no current through the solenoid, the plunger 30 falls, in turn releasing the butterfly valve 4 to be controlled by the mechanical governor 46. The spring 63 is extended and under such operation the collapsible assembly acts as a solid rod. The snap action of the spring 63 in opening the butterfly valve 4 is very desirable as it enables the gasoline engine to pick up the load immediately.

When the welding ceases the plunger 86 of the mercury relay tends to float because the solenoid 16 becomes de-energized. However, the flow of mercury out of the plunger is restricted by the small orifice 87. By varying the size of this orifice different lengths of time delays are available. After a period of time, possibly 12 to 15 seconds, enough mercury will have escaped through the orifice and the plunger will have risen to the extent that the contact is broken between the electrode 77 and the metal cylinder 86. When the short-circuit is removed from around the solenoid 25 current will again flow through the solenoid which in turn will cause the throttle valve 4 to close, thus cutting the engine to idling speed. It is apparent that if the governor 46 tries to open the butterfly valve under idling conditions of the engine, it will merely compress the spring 63 and will therefore leave the valve 40 in the closed throttle position caused by the pulling effect exerted at the solenoid 25.

It is apparent that the mercury switch shown in Figures 4 and 5 is of the slow break but fast make circuit type and this difference is obtained by reason of the fact that in order to break circuit from the electrode tip 77 to the metal cylinder 86 a relatively large quantity of mercury must flow through the opening 87.

The slow break circuit type of switch is particularly advantageous in the present invention because it permits a predetermined amount of time to elapse after the solenoid becomes de-energized as when the welding is momentarily stopped. The welding operation might have been temporarily discontinued in order to give the operator an opportunity of replenishing the welding electrode in which case it is not desirable to remove the short-circuit from the solenoid 26. It is therefore necessary to permit the solenoid to be energized by the removal of the short-circuit through the switch 17 only when the cessation of the welding operation continues beyond 12 or 15 seconds which would indicate that the welding operation was being discontinued indefinitely.

Figure 6 shows graphically the manner in which the switch 17 and the actuator 26 cooperate in order to provide an idling speed at the engine 1 when the welding operation is stopped beyond the period of time normally necessary to change electrodes. During the time period represented by the abscissa portion marked "welding" the engine is under the exclusive control of the speed governor 46. The solenoid 16 is energized and the tubular electrode 86 is in its downmost position as indicated in Figure 5. Now supposing that the arc is extinguished at the point $a$ in the graph, the solenoid 16 becomes de-energized and the electrode 86 starts to rise and it will not have completed its upward movement until 12 to 15 seconds later, this point being indicated $b$ on the graph. At this point, the circuit between electrodes 77 and 86 will have been broken so that the short-circuit is removed from the solenoid 25 and the valve 4 will have been moved to its closed throttle position. Under these circumstances the speed of the engine will start to drop as indicated at $c$ and will run at the idling speed up to a point indicated at $d$, at which time the arc is re-established. A short-circuit is then placed instantaneously about the solenoid through submersion of the electrode 77 in the mercury at which time the idling device 26 loses control and the latter is restored to the speed governor 46 in order to speed up the engine to the proper welding speed.

This application is a continuation of my application Ser. No. 511,011, filed November 20, 1943, entitled "Idling device."

It will be understood that I desire to comprehend within my invention such modifications as come within the scope of the claims and the invention.

Having thus described my invention, what I claim as new and desire to secure by Letters Patent, is:

1. In combination, an automotive engine and a welding generator coupled thereto, a welding circuit connected to the generator and means responsive entirely to the cessation of the welding arc for reducing the speed of the engine, said means being also controllable by the initiation of the welding arc for automatically increasing the speed of the engine, said means including an actuator connected through a flexible link to the throttle of the engine and operated by a powerful solenoid, means for energizing said solenoid and a switch controllable by the cessation of the welding arc for interrupting the energization of said solenoid, said switch being adapted to prevent energization of the solenoid when the welding arc is established, whereby the throttle of the engine is caused to either close or open depending on whether the welding arc has ceased or has been initiated.

2. In combination, an automotive engine and a welding generator coupled thereto, a welding circuit connected to the generator, a speed governor for controlling the speed of the engine when the load on the generator varies, and means responsive to the cessation of the welding arc for causing the engine to run at a reduced idling speed, said means including the combination of a time delay mercury switch and an electromagnetic actuator which is mechanically connected to the throttle of the engine, said switch being responsive to the arcing conditions in the welding circuit and serving to control the supply of energy to said actuator, and a slip joint connection between the governor and the engine throttle, the arrangement being such that there is no interference between the operation of the electromagnetic actuator and the speed governor when each of these elements controls the engine under no electrical load conditions and under full load conditions respectively.

3. In combination, an automotive engine and a welding generator coupled thereto, a welding circuit connected to a generator, a governor responsive to the speed of the engine and a mechanical connection between the governor and the throttle of the engine, means responsive entirely to the cessation of welding current for causing the engine to run at a reduced idling speed, said last mentioned means including an electromagnetic actuator mechanically connected to the engine throttle, the mechanical connection between the throttle and the speed governor being of the slip rod type which permits the actuator to operate the throttle under no welding current load conditions without interference with the speed governor and permits the speed governor to control the speed of the engine under full load welding current conditions without interference with the electromagnetic actuator.

4. In combination, an automotive engine and a generator connected thereto, a speed governor on the engine, and a combined extensible and compressible mechanical link between the governor and the throttle of the engine for maintaining the speed of the engine substantially constant, notwithstanding variations in the load on the generator, and means for reducing the speed of the engine to an idling speed when no load is on the generator, said last-mentioned means and said speed governor operating independently of one another and exerting a speed control influence respectively under no load and full load generator conditions.

5. In combination, an automotive engine and a generator connected thereto, a speed governor on the engine, and a combined extensible and compressible mechanical link between the governor and the throttle of the engine for maintaining the speed of the engine substantially constant, notwithstanding variations in the load on the generator, and means for reducing the speed of the engine to an idling speed when no load is on the generator, said last-mentioned means and said speed governor operating independently of one another and exerting a speed control influence respectively under no load and full load generator conditions, said link comprising a rod swivelly connected to one of the governor lever and the throttle valve, said rod being received by a sleeve connected to the other of the governor lever and the throttle valve, a compression spring contained within the sleeve and surrounding said rod, said spring abutting at one end a shoulder formed on the sleeve and at the other end a shoulder formed on said rod whereby the sleeve and the rod can be compressed or extended to accommodate wide changes in the position of the throttle valve when the control has been taken over by the electromagnetic actuator for idling the engine.

6. In combination, an automotive engine and a speed governor therefor operating through a throttle valve, said governor serving to regulate the open throttle conditions of said valve, said engine being coupled to a generator and a load circuit therefor, and means operating independently of said governor for controlling the full open and completely closed conditions of said valve, said means comprising a combined electrical and magnetic structure connected to said throttle valve and responsive to incipient changes in the generator voltage for operating said valve from the open to the closed position and vice versa, mechanical connections between each of said structures, said governor and said valve, said connections including a bell crank lever secured to said throttle valve, a chain connected at one end to the bell crank lever and at the other end to said structure, and a slip rod member joint connected at one end to said bell crank lever and at the other end to said speed governor.

EDWARD A. HOBART.